United States Patent
Rohee et al.

(10) Patent No.: US 6,364,413 B1
(45) Date of Patent: Apr. 2, 2002

(54) ARTICULATION MECHANISM FOR A VEHICLE SEAT

(75) Inventors: René Rohee, Le Cotil; Sébastien Leconte, Flers, both of (FR)

(73) Assignee: Bertrand Faure Equipement SA, Boulogne (FR)

( * ) Notice: Subject to any disclaimer, the term of this patent is extended or adjusted under 35 U.S.C. 154(b) by 0 days.

(21) Appl. No.: 09/549,354

(22) Filed: Apr. 14, 2000

(30) Foreign Application Priority Data

Apr. 20, 1999 (FR) ............................................. 99 04958

(51) Int. Cl.$^7$ ................................................. B60N 2/02
(52) U.S. Cl. ....................................................... 297/367
(58) Field of Search ................................. 297/367, 366, 297/373, 361.1

(56) References Cited

U.S. PATENT DOCUMENTS

| 4,770,464 A | | 9/1988 | Pipon et al. ................ 297/367 |
| 5,161,856 A | * | 11/1992 | Nishino |
| 5,681,086 A | * | 10/1997 | Baloche |
| 5,779,313 A | * | 7/1998 | Rohee |
| 5,788,325 A | * | 8/1998 | Ganot |
| 5,881,854 A | * | 3/1999 | Rougnon-Glasson |
| 5,985,413 A | | 11/1999 | Balcohe et al. ............. 297/367 |
| 6,007,152 A | * | 12/1999 | Kojima et al. |

FOREIGN PATENT DOCUMENTS

| EP | 0 720 930 | 7/1996 |
| EP | 0 741 956 | 11/1996 |
| EP | 0 773 132 | 5/1997 |
| FR | 2 559 684 | 12/1987 |
| FR | 2 770 469 | 5/1999 |
| GB | 2 117 440 | 10/1983 |

OTHER PUBLICATIONS

French Preliminary Search Report, Dec. 20, 1999, Appl. No. FR 9904958.

* cited by examiner

*Primary Examiner*—Milton Nelson, Jr.
(74) *Attorney, Agent, or Firm*—Marshall, Gerstein & Borun

(57) ABSTRACT

An articulation mechanism comprising a fixed cheek web, a rotational cheek web fitted with a circular tooth portion, two toothed inserts arranged at 120 degrees from each other, sliding relative to the fixed cheek web and adapted to engage with the circular tooth portion so as to lock the rotational cheek web, a cam to control the movement of the inserts, and a stop belonging to the fixed cheek web, arranged at 120 degrees from each of the inserts and acting as a support for the cam.

6 Claims, 1 Drawing Sheet

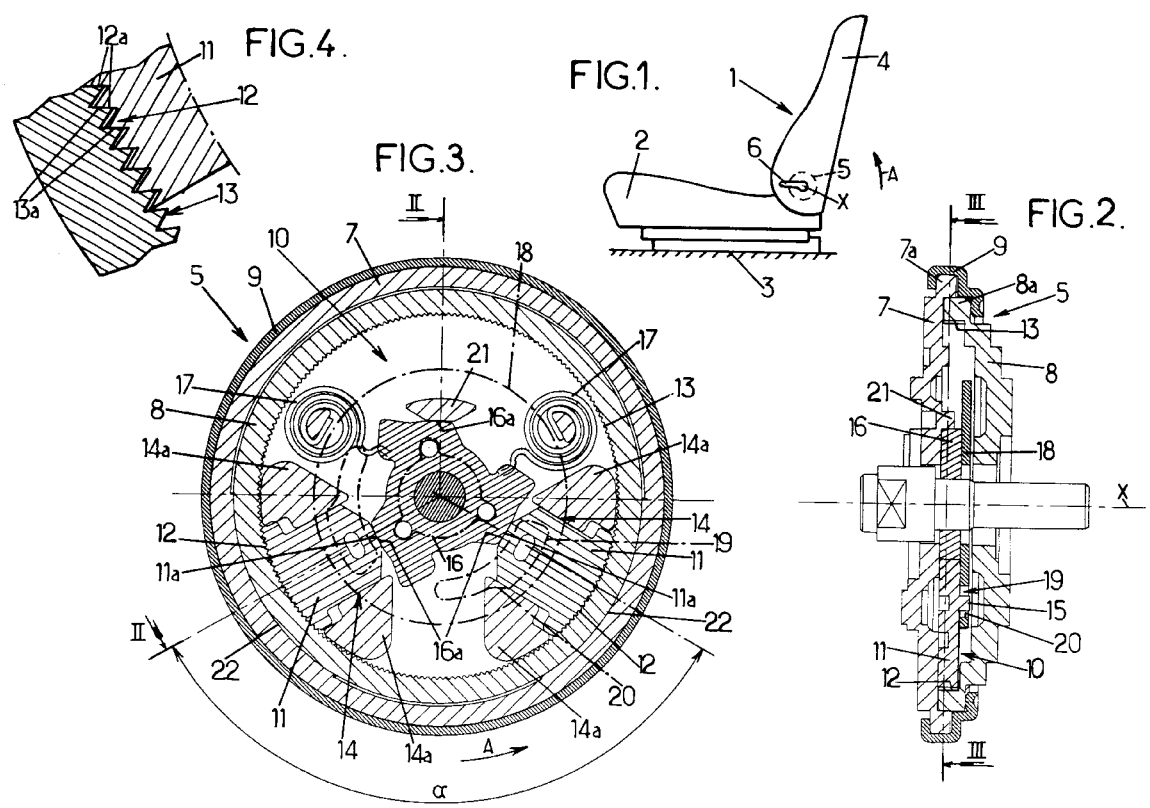

ARTICULATION MECHANISM FOR A VEHICLE SEAT

FIELD OF THE INVENTION

The present invention relates to articulation mechanisms for vehicle seats.

More particularly, the invention concerns an articulation mechanism for a vehicle seat, intended to connect two components belonging to the seat and pivotally mounted relative to each other around an axis of rotation, said articulation mechanism comprising:

first and second cheek webs intended to be fixed respectively to the two seat components, these cheek webs being pivotally mounted relative to each other around said axis of rotation, the second cheek web being fixed in a permanent way with a tooth portion which extends over at least a circular arc centered on the axis of rotation, several locking inserts each fitted with a tooth portion suitable to engage with the tooth portion of the second cheek web, each locking insert being movable relative to the first cheek web between an engagement position where the tooth portion of the locking insert engages with the tooth portion of the second cheek web to lock the articulation mechanism, and a withdrawn position where the locking insert does not engage with said tooth portion of the second cheek web, a cam to control the movement of the locking inserts, this cam comprising first, second and third support edges projecting outwards and distributed angularly around the axis of rotation, the third support edge of the cam making with the first and second support edges respective angles greater than 100 degrees, the cam being pivotally mounted around the axis of rotation and being acted upon by resilient means towards an angular off-position where the support edges of said cam place the locking inserts in their engagement position, and the cam being movable by a user to an angular operational position where said cam allows the locking inserts to move to their withdrawn position, and disengagement means adapted to place the locking inserts in their withdrawn position when the cam is in its operational position.

The above-mentioned disengagement means can be constituted particularly by one or more of the following means:

a pivoting insert fitted with cam edges engaging with a part of the locking inserts, one or more springs, the forms of the teeth of the tooth portion of the second cheek web and of the locking inserts, which forms are then adapted to make the inserts slide radially inwards as soon as the two cheek webs rotate relative to each other when the first cam is in its operational position, etc.

BACKGROUND OF THE INVENTION

Document EP-A-0 720 930 describes an example of such an articulation mechanism, intended to allow the adjustment of the angular position of the back of the seat relative to the seat part. This articulation mechanism comprises three locking inserts distributed angularly at 120 degrees from each other.

OBJECTS AND SUMMARY OF THE INVENTION

The articulation mechanism described in this document gives complete satisfaction, but the inventors of the present invention have wanted to improve on it still further, by making it lighter and less expensive.

To this end, according to the invention, an articulation mechanism of the type in question is essentially characterised in that the locking inserts are two in number and engage with the first and second support edges of the cam, and in that said locking mechanism comprises additionally a stop which is integral with the first cheek web and which is arranged so that the third support edge of the cam is supported radially on said stop when the cam is in its off-position, the third support edge of the cam making with the first and second support edges respective angles greater than 100 degrees such that the stop can exert on the cam a radial reaction adapted to counterbalance radial stresses exerted by the locking inserts on the cam when a pivoting torque is applied between the first and second cheek webs.

By means of these arrangements, an articulation mechanism is obtained which has a breaking strength comparable to the three-insert mechanisms of the prior art, while being lighter and less expensive on account of the elimination of one insert.

Moreover, the interior fitting of the articulation mechanism according to the invention is in the main identical to that of the three-insert mechanisms of the prior art, which makes it possible:

to retain in large part the manufacturing and assembly tools previously used for three-insert mechanisms, and/or to use these tools alternately to make three-insert mechanisms or two-insert mechanisms according to the invention, which brings an increase in flexibility to the manufacturing process.

These advantages help still further to reduce the cost price of the articulation mechanism according to the invention.

Lastly, the internal fitting of the articulation mechanism according to the invention makes it possible to release a part of the internal space between the first and second cheek webs, a space which can be used beneficially to add functionalities to the articulation mechanism.

In particular, this free space can be used to add to the articulation mechanism an angular position memorisation device similar to the one described for example in French patent application no. 97-13 702, intended to allow a vehicle seat back to be folded down in order to give access to the places in the rear of this vehicle, then for the back to be returned to its original angular position.

In preferred embodiments of the invention, it may be possible to use additionally one and/or other of the following arrangements:

the third support edge of the cam makes with the first and second support edges respective angles near to 120 degrees;

the first and second support edges of the cam each engage with a rear end belonging to one of the inserts and the stop is arranged approximately at the same distance from the axis of rotation as said rear ends of the locking inserts when these inserts are in the engagement position;

the first cheek web comprises at least one support area which is in permanent radial contact with the second cheek web, approximately without clearance, this support area being arranged near the locking inserts to take up radial stresses exerted by these locking inserts on the second cheek web when a pivoting torque is applied between the first and second cheek webs;

the first cheek web comprises two support areas which are each in permanent radial contact with the second cheek web, approximately without clearance, each support area being arranged in relation to one of the locking inserts;

the locking inserts are arranged so that, when they are in the engagement position, each tooth of each insert is supported against one face of the tooth portion of the second cheek web which is facing the stop.

BRIEF DESCRIPTION OF THE DRAWINGS

Other characteristics and advantages of the invention will emerge during the following description of one of its embodiments, given as a non-restrictive example, in relation to the attached drawings.

In the drawings:

FIG. 1 is a diagrammatic view of a seat the back of which is adjustable in inclination by means of at least one articulation mechanism according to the invention, FIGS. 2 and 3 are cross section views of an articulation mechanism according to one version of the invention, being able to be fitted to the seat in FIG. 1, these cross sections being taken respectively along the line II—II of FIG. 3 and along line III—III of FIG. 2, and FIG. 4 is an enlarged detailed view showing the engagement of the locking inserts located on the left of FIG. 3, with the tooth portion of the movable flange.

MORE DETAILED DESCRIPTION

In the different figures, the same references denote identical or similar elements.

As shown diagrammatically in FIG. 1, the invention concerns a vehicle seat 1, particularly an automobile vehicle front seat, which comprises, on the one hand, a seat part 2 mounted on the floor 3 of the vehicle, and on the other hand, a back 4 pivoting mounted on the seat part 2 around a horizontal transverse axis X.

More exactly, the rigid frame of the seat back is connected to the rigid frame of the seat part by an articulation mechanism 5 controlled by a handle 6 pivoting mounted around a horizontal transverse axis X, or else the frame of the back is connected to the seat part by two identical or similar articulation mechanisms 5 controlled by said handle.

The operation of the handle 6 in the angular direction A shown in FIG. 1 allows the articulation mechanism 5 to be unlocked, so that the user of the seat can adjust the inclination of the seat back 4 by acting directly on this back, said back being generally acted upon forwards by at least one spring (not shown).

As shown in FIGS. 2 and 3, the articulation mechanism 5 comprises:

- a fixed metal cheek web 7, which extends perpendicularly to the axis X and which may be fixed for example to the rigid frame of the seat part,
- a movable metal cheek web 8, which extends also perpendicularly to the axis X and which may be fixed for example to the frame of the seat back, the cheek web 8 comprising an external ring 8a which is surrounded by an external ring 7a belonging to the cheek web 7,
- a metal ring 9, which is crimped on the periphery of the fixed and mobile cheek webs delimiting with them a circular closed casing,
- and an insert locking device 10, which is contained in said casing and which is adapted to immobilise the movable cheek web 8 relative to the corresponding fixed cheek web 7 so long as the handle 6 is in its off-position.

The locking device 10 comprises:

- two metal locking inserts 11, which are arranged at 120° from each other relative to the axis X and which each have an external tooth portion 12 adapted to engage with an internal circular tooth portion 13 arranged in the movable cheek web 8, each of these inserts being mounted sliding radially in a guide 14 which is integral with the fixed cheek web 7 (the guide 14 can be laterally delimited for example by two half-cuts or stampings 14a provided in the fixed cheek web), so that the inserts are movable between, on the one hand, an engagement position where the tooth portion 12 of these inserts engages with the tooth portion 13 of the corresponding movable cheek web to lock the articulation mechanism 5, and, on the other hand, a withdrawn position where the inserts 11 do not engage with the tooth portion 13 of the movable cheek web, each insert comprising additionally a pin 15 which projects axially towards the movable cheek web 8,
- a metal cam 16 which is fixed to the handle 6, this cam having three support edges 16a projecting radially outwards and arranged at 120 degrees from each other relative to the axis X, two of these support edges being adapted to engage respectively with the rear ends 11a of the locking inserts 11 to drive the inserts back into the engagement position,
- two springs 17 which are mounted on the fixed cheek web 7 and which act upon the cam 15 towards an off-position where its support edges place the inserts 11 in their engagement position, said cam being able to pivot in the angular direction A under the action of the handle 6 allowing the inserts 11 to slide towards their withdrawn position thus unlocking the articulation mechanism 5,
- and a rigid metal wafer 18 which is rigidly connected to the cam 16 and which extends radially between said cam and the movable cheek web 8 partially covering the inserts 11, this wafer 18 comprising three cuts 19 in which are engaged the pins 15 of the inserts, each of these pins engaging with an edge 20 in the form of a ramp which delimits the corresponding cut 19 radially outwards and which is configured to move the corresponding insert 11 radially inwards when the cam turns in the angular direction A.

To guarantee resistance of the articulation mechanism 5 in respect of rotation torque which may be applied to it particularly when the vehicle in which the seat is installed sustains an accident, the fixed cheek web 7 comprises additionally a stop 21 which is preferably made in the form of a half-cut or stamping provided in said cheek web.

This stop 21 is arranged in the same radial position as the rear ends 11a of the two locking inserts 11 when these inserts are in the engagement position, at 120° from each of these inserts relative to the axis X, with the result that the support edge 16a of the cam which does not engage with the inserts 11 is supported radially on the stop 21 when the cam 16 is in its off-position.

Thus, when the articulation mechanism 5 sustains a severe pivoting torque, the reaction forces exerted by the locking inserts 11 on the cam 16 are taken up by the stop 21.

Furthermore, the resistance of the articulation mechanism 5 in respect of pivoting torque is still further improved thanks to the presence of two support areas 22 projecting inwards from the ring 7a of the fixed cheek web which surrounds the ring 8a of the movable cheek web.

The two support areas 22 are in permanent contact against said ring 8a of the movable cheek web, with the result that said support areas take up the radial reaction forces exerted by the locking inserts 11 on the movable cheek web 8 when the articulation mechanism 5 sustains a strong pivoting torque.

Possibly, these two support areas 22 could be replaced by a single support area, preferably centred on the diametric axis passing through the stop 21.

Furthermore, to advantage, the angle a formed between the sliding axes of the two inserts 11 is preferably slightly less than 120°, for example 119°, so that the teeth of the inserts 11 do not correspond exactly with the teeth of the tooth portion 13, but are on the contrary very slightly offset so that each tooth 12a of the inserts 11 is supported only on one face 13a of one of the teeth 13 which is facing towards the stop 21 (see FIG. 4). The locking of the movable cheek web 8 by the inserts 11 is thus improved by eliminating any clearance of said movable cheek web, as shown in the document FR-A-2 599 684.

We claim:

1. An articulation mechanism for a vehicle seat, intended to connect two components belonging to the seat and pivotally mounted in relation to each other around an axis of rotation, said articulation mechanism comprising:

first and second cheek webs intended to be fixed respectively to the two seat components, these cheek webs being pivotally mounted in relation to each other around said axis of rotation, the second cheek web being fixed in permanent way to a tooth portion which extends over at least a circular arc centered on the axis of rotation several locking inserts each fitted with a tooth portion suitable to engage with the tooth portion of the second cheek web, each locking insert being movable relative to the first cheek web between an engagement position where the tooth portion of the locking insert engages with the tooth portion of the second cheek web to lock the articulation mechanism, and a withdrawn position where the locking insert does not engage with said tooth portion of the second cheek web, a cam to control the movement of the locking inserts, this cam comprising first, second and third support edges projecting outward and distributed angularly around the axis of rotation, the third support edge of the cam making with the first and second support edges respective angles greater than 100 degrees, the cam being pivotally mounted around the axis of rotation and being acted upon by resilient means towards an angular off-position where the support edges of said cam place the locking inserts in their engagement position, and the cam being movable by a user to an angular operational position where said cam allows the locking inserts to move to their withdrawn position, and disengagement means adapted to place the locking inserts in their withdrawn position when the cam is in its operational position, wherein the locking inserts are two in number and engage with the first and second support edges of the cam, and wherein said locking mechanism comprises additionally a stop which is integral with the first cheek web and which is arranged so that the third support edge of the cam is supported radially on said stop when the cam is in its off-position, such that the stop can exert on the cam a radial reaction adapted to counterbalance radial stresses exerted by the locking inserts on the cam when a pivoting torque is applied between the first and second cheek webs.

2. An articulation mechanism according to claim 1, in which the third support edge of the cam makes with the first and second support edges respective angles near to 120 degrees.

3. An articulation mechanism according to claim 1, in which the first and second support edges of the cam each engage with a rear end belonging to one of the inserts and the stop is arranged approximately at the same distance from the axis of rotation as said rear ends of the locking inserts when these inserts are in the engagement position.

4. An articulation mechanism according to claim 1, in which the first cheek web comprises at least one support area which is in permanent radial contact with the second cheek web, approximately without clearance, this support area being arranged near the locking inserts to take up radial stresses exerted by these locking inserts on the second cheek web when a pivoting torque is applied between the first and second cheek webs.

5. An articulation mechanism according to claim 4, in which the first cheek web comprises two support areas which are each in permanent radial contact with the second cheek web, approximately without clearance, each support area being arranged in relation to one of the locking inserts.

6. An articulation mechanism according to claim 1, in which the locking inserts are arranged so that, when they are in the engagement position, each tooth of each insert is supported against one face of the tooth portion of the second cheek web which is facing the stop.

* * * * *